(12) United States Patent
Ranganathan et al.

(10) Patent No.: US 12,202,984 B2
(45) Date of Patent: Jan. 21, 2025

(54) AMBIENT CURED COATING COMPOSITIONS FOR CABLES AND CABLE ACCESSORIES

(71) Applicants: General Cable Technologies Corporation, Highland Heights, KY (US); Novota Industries, Mumbai (IN)

(72) Inventors: Sathish Kumar Ranganathan, Avon, IN (US); Srinivas Siripurapu, Monza (IT); Vitthal Abaso Sawant, Muscat (OM); Vijay Mhetar, Conroe, TX (US); Satish Narayan Patil, Mumbai (IN); Rajendra Yashwant Chaudhari, Thane (IN)

(73) Assignees: General Cable Technologies Corporation, Highland Heights, KY (US); Novota Industries, Mumbai (IN)

( * ) Notice: Subject to any disclaimer, the term of this patent is extended or adjusted under 35 U.S.C. 154(b) by 20 days.

(21) Appl. No.: 17/483,205

(22) Filed: Sep. 23, 2021

(65) Prior Publication Data

US 2022/0010142 A1 Jan. 13, 2022

Related U.S. Application Data

(62) Division of application No. 15/796,005, filed on Oct. 27, 2017, now abandoned.

(Continued)

(51) Int. Cl.
*H01B 3/02* (2006.01)
*B05D 7/14* (2006.01)

(Continued)

(52) U.S. Cl.
CPC ............... *C09D 1/02* (2013.01); *B05D 7/14* (2013.01); *B05D 7/20* (2013.01); *C09D 5/22* (2013.01);

(Continued)

(58) Field of Classification Search
CPC ........ B05D 1/18; B05D 7/20; B05D 2256/00; H01B 3/02; C09D 1/02; C09D 5/22

(Continued)

(56) References Cited

U.S. PATENT DOCUMENTS 6,464,774 B1 * 10/2002 Satoh .................. C04B 41/5089
106/600
7,683,262 B2 * 3/2010 Guery .................... H01B 3/428
174/102 R (Continued)

FOREIGN PATENT DOCUMENTS

CN 1328096 A 12/2001
CN 101704659 A 5/2010

(Continued)

OTHER PUBLICATIONS

Third Office Action issued in Chinese Patent Application No. 201780081102.2; Dec. 22, 2021; 16 pages with English translation.

(Continued)

*Primary Examiner* — Brian K Talbot
(74) *Attorney, Agent, or Firm* — Frost Brown Todd LLP

(57) ABSTRACT

Compositions including a filler, an emissivity agent, a crosslinking facilitator, and a metal silicate binder are disclosed. The compositions can be curable at ambient conditions. Methods of coating overhead conductor and power transmission line accessories with such coating compositions are also disclosed.

18 Claims, 4 Drawing Sheets

Related U.S. Application Data

(60) Provisional application No. 62/414,563, filed on Oct. 28, 2016.

(51) Int. Cl.

| | | |
|---|---|---|
| *B05D 7/20* | (2006.01) | |
| *C09D 1/02* | (2006.01) | |
| *C09D 5/22* | (2006.01) | |
| *B05D 1/02* | (2006.01) | |
| *B05D 1/18* | (2006.01) | |
| *B05D 3/00* | (2006.01) | |
| *B05D 3/12* | (2006.01) | |

(52) U.S. Cl.
CPC .............. *H01B 3/02* (2013.01); *B05D 1/02* (2013.01); *B05D 1/18* (2013.01); *B05D 3/002* (2013.01); *B05D 3/12* (2013.01); *B05D 2202/10* (2013.01); *B05D 2256/00* (2013.01)

(58) Field of Classification Search
USPC ..................................... 427/117–120, 372.2
See application file for complete search history.

(56) References Cited

U.S. PATENT DOCUMENTS

| | | | | |
|---|---|---|---|---|
| 9,328,245 | B2* | 5/2016 | Siripurapu | C08K 3/346 |
| 9,859,038 | B2* | 1/2018 | Davis | H01B 13/30 |
| 2002/0034650 | A1* | 3/2002 | Neely, Jr. | C04B 41/009 |
| | | | | 427/397.8 |
| 2005/0027074 | A1* | 2/2005 | Lewin | C09D 175/04 |
| | | | | 525/123 |
| 2006/0051580 | A1* | 3/2006 | Bryant | H01B 5/105 |
| | | | | 428/375 |
| 2010/0076719 | A1* | 3/2010 | Lawry | G01J 5/0096 |
| | | | | 702/136 |
| 2014/0041925 | A1* | 2/2014 | Davis | H01B 3/46 |
| | | | | 174/40 R |
| 2015/0235739 | A1* | 8/2015 | Davis | H01B 5/002 |
| | | | | 174/40 R |
| 2015/0353737 | A1* | 12/2015 | Siripurapu | C09K 5/14 |
| | | | | 427/397.8 |
| 2016/0032107 | A1* | 2/2016 | Siripurapu | H01B 7/29 |
| | | | | 427/117 |
| 2018/0118952 | A1 | 5/2018 | Ranganathan et al. | |

FOREIGN PATENT DOCUMENTS

| | | | | |
|---|---|---|---|---|
| CN | 102822287 A | | 12/2012 | |
| CN | 104086913 A | * | 10/2014 | |
| CN | 104704580 A | | 6/2015 | |
| WO | 2014025420 A1 | | 2/2014 | |
| WO | WO-2015191736 A1 | * | 12/2015 | ............... C08K 3/22 |

OTHER PUBLICATIONS

Second Office Action issued in Chinese Patent Application No. 201780081102.2; Sep. 24, 2021; 16 pages with English translation.

First Office Action issued in Chinese Patent Application No. 201780081102.2; Jan. 21, 2021; 14 pages including English translation.

Marsitzky, Dirk; Extended European search report issued in European Patent Application No. 17866189.8; May 29, 2020; 6 pages.

Ramchander, N.; First Examination Report issued in Indian Patent Application No. 201927016656; Feb. 8, 2021; 5 pages.

Roy, Debashis; Examination Report No. 2, issued in Australian Patent Application No. 2017348351; Feb. 15, 2022; 3 pages.

* cited by examiner

AMBIENT CURED COATING COMPOSITIONS FOR CABLES AND CABLE ACCESSORIES

REFERENCE TO RELATED APPLICATIONS

The present application claims the priority of U.S. application Ser. No. 15/796,005, entitled AMBIENT CURED COATING COMPOSITIONS FOR CABLES AND CABLE ACCESSORIES, filed Oct. 27, 2017, and hereby incorporates the same application herein by reference in its entirety. The present application also claims the priority of U.S. provisional application Ser. No. 62/414,563, entitled AMBIENT CURED COATING COMPOSITIONS FOR CABLES AND CABLE ACCESSORIES, filed Oct. 28, 2016, and hereby incorporates the same application herein by reference in its entirety.

TECHNICAL FIELD

The present disclosure generally relates to the ambient curing of coating compositions for cables and cable accessories. The coating compositions include metal silicate binders.

BACKGROUND

Coatings formed from compositions including metal silicate binders can exhibit a variety of useful properties making such coatings particularly suitable for overhead conductors and other power transmission line accessories. For example, coatings formed from such compositions can exhibit high durability, long lifespans, and resistance to corona, corrosion, and dust. Additionally, such coatings can be modified to exhibit high thermal emissivity which can allow overhead conductors and power transmission line accessories to operate at lower temperatures. However, known compositions including metal silicate binders require high temperatures to cure limiting the usefulness of the compositions. It would therefore be advantageous to offer methods of applying and curing compositions including metal silicate binders under ambient conditions.

SUMMARY

According to one embodiment, a composition includes a filler, an emissivity agent, a crosslinking facilitator, and a metal silicate binder. The crosslinking facilitator includes a latent acid compound.

According to another embodiment, a method of forming a coating article includes providing a coating composition, applying the coating composition onto the outer surface of an article and curing the coating composition at a temperature of from about 15° C. to about 40° C. The composition includes a filler, an emissivity agent, a crosslinking facilitator, and a metal silicate binder. The crosslinking facilitator includes a latent acid compound.

DETAILED DESCRIPTION

Figure 1:
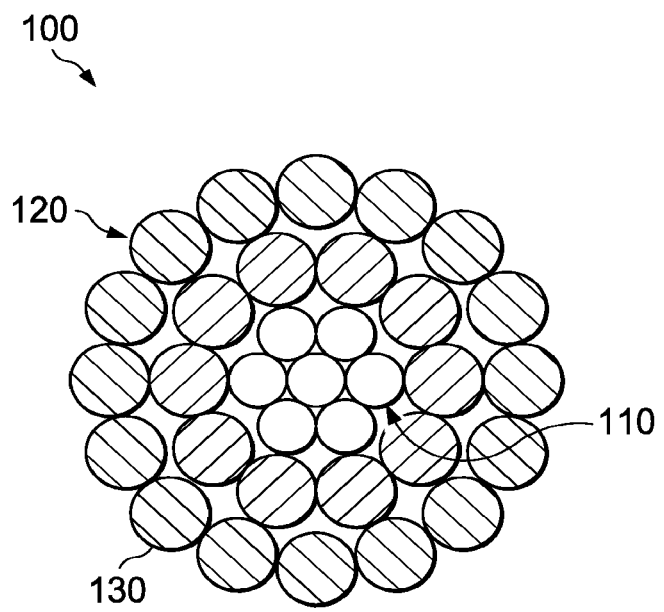
FIG. 1 depicts a cross-sectional view of a bare conductor having a plurality of core wires according to one embodiment.
Figure 2:
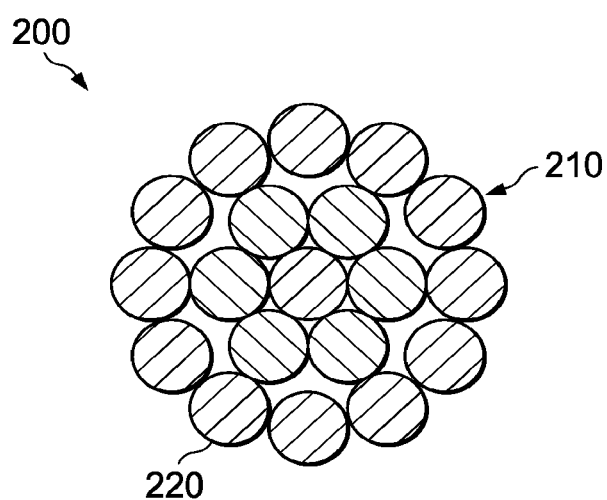
FIG. 2 depicts a cross-sectional view of a bare conductor without core wires according to one embodiment.
Figure 3:
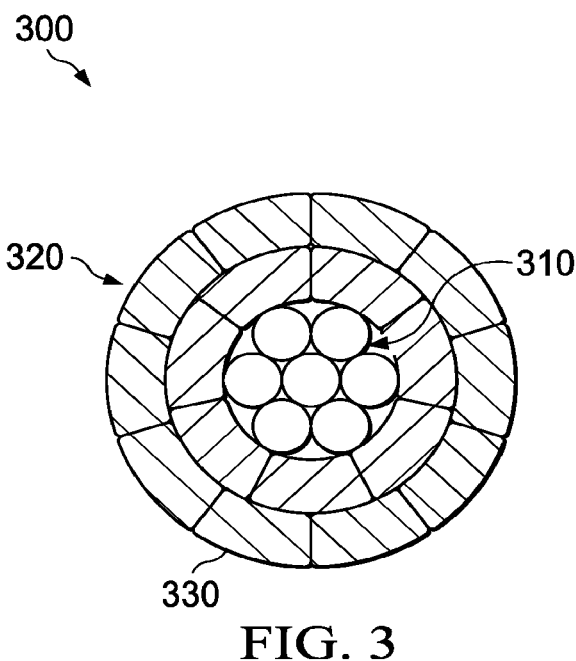
FIG. 3 depicts a cross-sectional view of a bare conductor formed of trapezoidal shaped conductive wires and having a plurality of core wires according to one embodiment.
Figure 4:
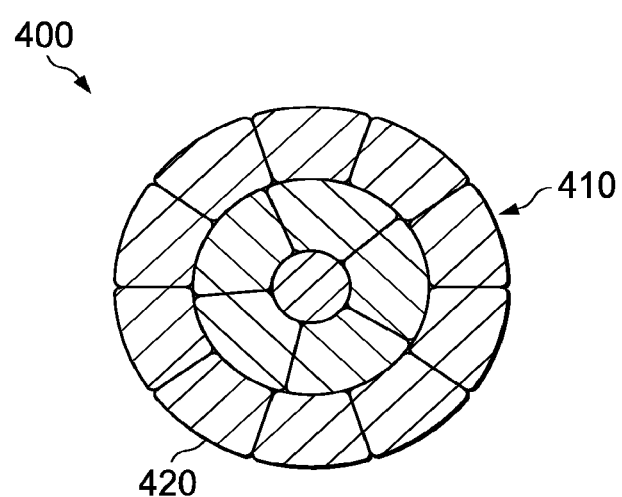
FIG. 4 depicts a cross-sectional view of a bare conductor formed from trapezoidal shaped conductive wires and without core wires according to one embodiment.

Compositions including metal silicate binders can be useful as coatings for overhead conductors and power transmission line accessories. For example, the compositions described in U.S. Patent App. Pub. No. 2015/0353737 and U.S. Pat. No. 9,328,245, each incorporated herein by reference, provide flexible and durable coatings for overhead conductors with improved heat emissivity. The utility of such known compositions is limited, however, by the elevated temperatures required to cure the metal silicate binders in known compositions.

It has been discovered that use of certain crosslinking facilitators, such as latent acid compounds and amphoteric metal powders, can provide suitable curing of such compositions under generally ambient conditions. As used herein, ambient conditions can mean in an environment having a temperature of about 15° C. to about 40° C. in certain embodiments, about 20° C. to about 35° C. in certain embodiments, and about 25° C. to about 30° C. in certain embodiments. An environment at ambient conditions can further mean having a relative humidity of about 40% to about 95% in certain embodiments, about a relative humidity of about 50% to about 90% in certain embodiments, and about a relative humidity of about 60% to about 80% in certain embodiments.

As used herein, latent acid compounds can refer to pH reducing agents that can release an acid component to the surrounding environment under appropriate conditions. It is believed that the inclusion of such latent acid compounds can enable the curing of the composition described herein by providing for the controlled reduction of the pH levels from an alkaline pH to a level suitable to effectuate curing of the metal silicate binders. It is further believed that the use of latent acid compounds can facilitate curing over a suitable time period to enable adequate workability of the composition before curing is complete. As can be appreciated, metal silicate binders can exhibit an alkaline pH of about 10 to about 14 without modification, Under such alkaline conditions, metal silicate binders are stable. Reduction of the pH caused by the latent acid releasing an acid component can cause the metal silicate binders to begin crosslinking. Specifically, at a pH or about 11 or less, silanol bonds can form between the silica anions of the metal silicate binder.

Suitable latent acid compounds for the compositions described herein can include latent acid compounds which can release an acid component when dispersed in environments having a pH of about 9 or more in certain embodiments. Under more acidic conditions, latent acids do not release the acid component. As can be appreciated, multiple types of latent acid compounds can be suitable including, for example, latent acid compounds which release carbon dioxide under appropriate conditions and latent acid compounds which hydrolyze under appropriate conditions. More specific examples of suitable latent acid compound classes can include condensed aluminum phosphates, various organic and inorganic carbonates that release carbon dioxide, esters that hydrolyze under alkaline conditions to release acid component, inorganic ammonium salts, and organic ammonium salts of carboxylic acid. For example, condensed aluminum phosphates, tetraethyl ammonium borate, sodium silicofluoride, borax, boric acid, ammonium chloride, diammonium phosphate, ammonium sulfate, ammonium nitrate, ammonium acetate, formamide, ammonium oxalate, ammonium citrate, triacetin, calcium lignosulphonate, sodium pyrophosphate, and combinations thereof can be suitable latent acid compounds in certain embodiments. Upon contact with the alkaline metal silicate binders, the latent acid compounds can release an acid component and can reduce the pH of the described compositions to a pH of about 11 or less in certain embodiments, to a pH of about 10 or less in certain embodiments, and to a pH of about 9 or less in certain embodiments to thereby effectuate crosslinking of the metal silicate binders.

In certain embodiments, the crosslinking facilitator can additionally, or alternatively, be an amphoteric metal powder. Amphoteric metal powders can react with metal silicate binders to form a ceramic bond. Particularly advantageous amphoteric metal powders include zinc powders which can crosslink metal silicate binders under ambient conditions to form a metal zinc silicate. As can be appreciated, other amphoteric metal powders can also be suitable including aluminum powders. In certain embodiments, amphoteric metal powders can be used as a supplement to other crosslinking facilitators which may crosslink faster or crosslink other metal silicate moieties.

As can be appreciated, the substrate the compositions are applied to can also act as an amphoteric metal. This reaction can take place even with the surface of the substrate is slightly oxidized. For example, the surface of an aluminum substrate rapidly oxidizes to bohemite (AlO(OH)) after cleaning (e.g., through sandblasting).

In certain embodiments, the crosslinking facilitator can also, or alternatively, be a silane compound. Suitable silane crosslinking facilitators can include trimethoxy silanes and fluoro silanes. For example, octyl trimethoxy silane, methyl trimethoxy silane, phenyl trimethoxy silane, fluorinated silanes thereof, and combinations thereof can be suitable silane crosslinking facilitators for the compositions described herein. In certain embodiments using silane crosslinking facilitators, it can be advantageous to reduce the pH of the composition to improve the reaction kinetics. For example, in certain embodiments, silane crosslinking facilitators can advantageously be used in combination with a latent acid.

According to certain embodiments, crosslinking facilitators can be included at about 0.5% to about 20%, by dry weight, of the described compositions. In certain embodiments, crosslinking facilitators can be included at about 3% to about 15%, by dry weight, of the described compositions. In certain embodiments, crosslinking facilitators can be included at about 7.5% to about 12.5%, by dry weight, of the described compositions. In certain embodiments, crosslinking facilitators can alternatively be added at about 5% to about 40%, by weight of the metal silicate binders, at about 7.5% to about 35%, by weight of the metal silicate binders, or at about 10% to about 30%, by weight of the metal silicate binders.

Generally, any of the crosslinking facilitators described herein can be effective to crosslink one or more metal silicate binders including in the described compositions. According to certain embodiments, suitable metal silicate binders can include potassium silicate, sodium silicate, lithium silicate, calcium silicate, and combinations thereof. In certain embodiments, a deionized form of a metal silicate binder, such as an aqueous colloidal silica, can alternatively, or additionally, be included. In certain embodiments, suitable metal silicate binders can have a metal oxide to silica ratio of about 1:1 to about 1:10 in certain embodiments, or a ratio of about 1:2 to about 1:4 in certain embodiments. In certain embodiments, a combination of metal silicate binders such as a combination of potassium silicate, lithium silicate, sodium silicate, and colloidal silica can be useful. Overall, the described compositions can include a metal silicate binder at about 10% to about 60%, by weight, in certain embodiments, at about 20% to about 50%, by weight, in certain embodiments, and at about 25% to about 40%, by weight, in certain embodiments.

As can be appreciated, compositions including metal silicate binders can generally include a number of additional components. For example, in addition to metal silicate binders and crosslinking facilitators, the described compositions can include one or more activating agents in certain embodiments.

Generally, activating agents can improve bonding between metal silicate binders and aluminum substrates. In certain embodiments, suitable activating agents can be multivalent cations which can interact with the metal silicate binders to improve substrate bonding. As can be appreciated, multivalent cations can be included in the described compositions through inclusion of a variety of precursor compounds such as multivalent cation containing zeolites; salts, oxides, and hydroxides of multivalent metals; ammonia complexes of multivalent metal ions; and minerals such as calcium silicate (e.g., wollastonite). In certain embodiments, the multivalent cations can be divalent cations.

As can be appreciated, zeolites are aluminosilicate materials which have a porous crystalline solids structure. The channels and pores of the porous structure can contain loosely held exchangeable cations such as $Na^+$, $K^+$, $Ca^{2+}$, and $Mg^{2+}$, and $Al^{2+}$ cations. It has been found that in an aqueous solution, the loosely held cations of suitable zeolites can exchange with the cation of a metal silicate binder in an ion exchange process. The ion exchange process can facilitate bonding of the compositions described herein to the substrate through precipitation reactions. Suitable zeolites can include any zeolites which undergo ion exchange with the metal silicate binder of a composition. For example, zeolites which contain divalent cations such as calcium and magnesium cations (e.g., $Ca^{2+}$ and $Mg^{2+}$ cations) can be suitable as such zeolites will exchange cations with sodium and potassium silicate. As can be appreciated, a mix of multiple zeolites can also be suitable. A mix of multiple zeolites can be useful to adjust the curing time and properties of the final coating by, for example, adjusting the rate at which the zeolites release the cations. A suitable zeolite can have a chemical formula of $Na_2O$, $Al_2O_3$, $nSiO_2$, or $xH_2O$ in certain embodiments.

Generally, suitable zeolites can be included in a composition described herein in micronized form. For example, suitable zeolites can have an average particle diameter of about 100 nm to about 100 microns in a certain embodiment, about 1 micron to about 75 microns in certain embodiments, and about 10 microns to about 60 microns in certain embodiments.

In certain embodiments, suitable activating agents can alternatively, or additionally, be salts, oxides, or hydroxides of multivalent metals such as the water-soluble salts, oxides, and hydroxides of calcium, magnesium, zinc, aluminum, and zirconium. As can be appreciated, solvation or dissolution of such compounds can release a suitable cation such as a calcium cation or a magnesium cation. Acting similarly to zeolite activating agents, the release of cations can allow an ion exchange process to occur with a metal silicate binder and can improve bonding of the described compositions to a substrate.

As can be appreciated, suitable multivalent cations can also, or alternatively, be added from other compounds. For example, in certain embodiments, divalent cationic calcium ions can be added from calcium silicate. Weak dissolution of calcium silicate minerals, such as wollastonite, can release divalent $Ca^{2+}$ cations to the described compositions.

In embodiments including activating agents, the activating agents can be included at about 0.5% to about 20%, by dry weight, of the described compositions. In certain embodiments, activating agents can be included at about 1% to about 10%, by dry weight, of the described compositions. In certain embodiments, activating agents can be included at about 1.5% to about 5%, by dry weight, of the described compositions.

In certain embodiments, additional components can still further be included in the described compositions. For example, one or more polymer emulsions, emissivity agents, stabilizers, defoamers, emulsifiers, and plasticizers can be included to tailor the properties of the cured compositions or improve the workability of the uncured compositions.

In certain embodiments, polymer emulsions can be included in the described compositions to improve the green strength of the composition and to improve the durability of the cured compositions. For example, acrylic copolymers can improve the green strength of the cured compositions described herein and can provide the compositions with resistance to UV damage. In certain embodiments, suitable acrylic copolymers can be hydroxyl functional acrylic copolymers. In certain embodiments, polymer emulsions can be included at about 0.1% to about 20%, by dry weight, of the described compositions. In certain embodiments, polymer emulsions can be included at about 1% to about 10%, by dry weight, of the described compositions. In certain embodiments, polymer emulsions can be included at about 2.5% to about 7.5%, by dry weight, of the described compositions.

As can be appreciated, one or more fillers can be included to influence the mechanical and electrical properties of the described compositions. Generally any filler known in the cabling industry can be suitable including quartz, aluminum oxide, mica, calcined kaolin, wollastonite, calcite, zirconia, zircon, micaceous iron oxide, iron oxide, aluminum silicates (including synthetic aluminosilicates), talc (sometimes referred to as hydrated magnesium silicate), barium sulfate, lithopone, and combinations thereof. Particularly advantageous fillers can include talc, calcined kaolin, aluminum oxide, and quartz.

In certain embodiments, suitable fillers can have an average particle size of about 50 microns or less, in certain embodiments, about 20 microns or less, and in certain embodiments, about 5 microns or less. The total amount of filler in a composition can be about 10% to about 70%, by weight, of the composition, about 20% to about 60%, by weight of the composition, and about 35% to about 50%, by weight, of the composition.

In certain embodiments, emissivity agents can be included in the described compositions to improve the ability of the cured composition to radiate heat away from underlying substrate. For example, the operating temperature of an overhead conductor is determined by the cumulative effect of heating and cooling on the cable including heat generated through conductor resistance losses, heat absorbed from external sources, and heat emitted away from the cable through conduction, convection, and radiation. The inclusion of a suitable emissivity agent into a composition can enable an overhead conductor coated with the cured composition to operate cooler than a similar overhead conductor coated without the emissivity agent by increasing the amount of heat emitted by the cable. In certain embodiments, an overhead conductor coated with a composition including an emissivity agent can operate about 5° C. or cooler when tested in accordance to ANSI C119.4-2004, than a similar overhead conductor coated without the emissivity agent. In certain embodiments, an overhead conductor coated with a composition including an emissivity agent can operate about 10° C. or cooler when tested in accordance to ANSI C119.4-2004, than a similar overhead conductor coated without the emissivity agent. In certain embodiments, an overhead conductor coated with a composition including an emissivity agent can operate about 20° C. or cooler when tested in accordance to ANSI C119.4-2004, than a similar overhead conductor coated without the emissivity agent.

As can be appreciated, a reduction in operating temperature can allow for either thinner conductors to be utilized for a given current carrying capacity (ampacity) or for increased current carrying capacity to be used on traditionally sized conductors. For example, a cable coated with the described compositions can operate at a lower temperature while conducting 1900 amps than a similar, uncoated, cable conducting only 1500 amps. Lower operating temperatures also reduce the amount of energy loss to ohmic heating. As can be appreciated, other benefits are also possible such as a reduction in sag due to the ability to use thinner conductors. Additional benefits are described in U.S. Patent App. Pub. No. 2015/0353737 and U.S. Pat. No. 9,328,245, each incorporated herein by reference.

Examples of suitable emissivity agents can include gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, chromium oxides, iron oxide, boron carbide, boron silicide, copper chromium oxide, titanium dioxide, aluminum nitride, boron nitride, alumina, and combinations thereof. In certain embodiments, a combination of multiple emissivity agents can be used. For example, in certain embodiments, silicon carbide, boron carbide, and titanium dioxide can be included as emissivity agents. As can be further appreciated, certain emissivity agents can be formed into a single compound such as an eutectic mixture of silicon carbide and boron carbide having a ratio of 99:1 silicon carbide and boron carbide. Compositions described herein which include an emissivity agent can include the emissivity agent at about 6% to about 42%, by weight, of the composition in certain embodiments, at about 10% to about 35%, by weight, of the composition in certain embodiments, and at about 15% to about 28%, by weight, of the composition in certain embodiments.

Stabilizers can be included in a composition to improve the lifespan and processability of the composition. Examples of suitable stabilizers can include bentonite, kaolin, magnesium alumina silica clay, and stabilized zirconium oxide. Additionally, or alternatively, other ball clay stabilizers can also be included as a suitable stabilizer. In certain embodiments, the stabilizer can advantageously be bentonite. When included, a stabilizer can be added at about 0.1% to about 2%, by weight, of a composition.

In certain embodiments, a defoamer can be included to inhibit, or retard, the formation of foam when water is added to the dry components of a composition. Suitable examples of defoamers can include silicon-based antifoam agents and non-silicon-based antifoam agents. Certain surfactants can also be used as a defoamer. Examples of such surfactants can include, but are not limited to, cationic, anionic, or non-ionic surfactants, and fatty acid salts. A defoamer can be added at about 0.2% to about 1.5%, by weight, of a composition.

An emulsifier can be included to maintain an even dispersion when water is added to a dry composition. Suitable examples of emulsifiers can include sodium lauryl sulfate, sodium dodecyl phenylsulfonate, potassium stearate, sodium dioctyl sulfosuccinate, dodecyl diphenyloxy disulfonate, ammonium nonyl phenoxyethyl poly(1) ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinine, sodium 1-alkoxy-2-hydroxypropyl sulfonate, sodium α-olefin($C_{14}$-$C_{16}$)sulfonate, hydroxyl alkanol sulfate, tetra sodium N-(1, 2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate. An emulsifier can be included at about 2% to about 3%, by weight, of a composition.

Suitable compositions can additionally include a plasticizer to improve the flexibility of the coating layer after application to a substrate. Suitable examples of a plasticizer can include one or more of glycerol, sugar, and cellulose.

The components of the compositions described herein can be dispersed in a liquid carrier. Although the liquid carrier is usually water, organic dispersants can also be suitable. For example, alcohols, ketones, esters, hydrocarbons, and combinations thereof can each be suitable as an organic dispersant. As can be appreciated, a mixture of water and water miscible organic dispersants can also be suitable. When dispersed in a liquid carrier, the total solids content of a composition can vary from about 20% to about 80% in certain embodiments, about 30% to about 70% in certain embodiments, about 35% to about 55% in certain embodiments, and about 40% to about 50% in certain embodiments. In certain embodiments, the compositions described herein can be substantially free of organic solvents.

As can be appreciated, it can be useful to physically separate the crosslinking facilitators from the metal silicate binders until just prior to application and use of the composition to prevent premature reaction and curing of the compositions. For example, it can be useful for compositions to be provided in the form of a compositional kit with the metal silicate binder separated from the remaining components of the composition until just prior to application and use of the composition to form a coating. In such embodiments, the first compositional part can include all of the components of a coating composition except the metal silicate binder and the second compositional part can include the metal silicate binder. As can be appreciated however, the components included in each compositional part can be varied as long as the metal silicate binder is separated from any crosslinking facilitators. Other variations are possible. For example, certain components can be microencapsulated and dispersed in a single composition in certain embodiments. Alternatively, certain components can be pre-applied to the substrate to be coated in certain embodiments.

For compositional kits, the first and second compositional parts can be mixed separately and can be kept separated until just prior to use. The components of the first compositional part can be mixed and then stored dry or wet. The resulting first compositional part, as a wet mixture, can be a suspension with a total solids content of about 30% to about 55% in certain embodiments, a total solids content of about 35% to about 50% in certain embodiments, and a total solids content of about 43% to about 50% in certain embodiments. A wet second compositional part can similarly be prepared. The second compositional part, as a wet mixture, can be a suspension with a total solids content of about 20% to about 50% in certain embodiments, a total solids content of about 25% to about 45% in certain embodiments, and a total solids content of about 30% to about 38% in certain embodiments. The two-parts of the compositional kit, whether dry or wet, can be separated prior to use to prevent premature curing. As can be appreciated, the weight or volume of each composition kit does not need to be equal. For example, in certain embodiments, a first compositional kit, including each component except the metal silicate binders, can be about 60% by weight of the final composition.

The compositional kit can begin to cure as soon as the two compositional parts are mixed. As a result of the curing process, the viscosity of the composition described herein can increase with time. Because high viscosity adversely affects the ability to apply the composition onto a bare conductor or a power transmission line accessory, the mixing of the first and second compositional parts can advantageously be delayed until just before application.

Upon mixing of the two compositional parts, the coating composition can be used to coat a bare conductor or accessory. Upon mixing of the two parts in a wet mixture, the viscosity of the wet mixture can be from about 10 seconds to about 30 seconds, in certain embodiments from about 13 seconds to about 25 seconds, and in certain embodiments from about 15 seconds to about 20 seconds as measured by using a B4 Ford cup in accordance to ASTM D1200 (2010). The wet mixture can be prepared in a High Speed Disperser ("HSD"), Ball Mill, Bead mill or using other techniques known in the art. As illustration, a HSD can be used to make a composition be slowly added together the first and second composition parts and mixing until the desired dispersion of the components is achieved. In certain embodiments, the mixer speed can be about 10 rpm or more to achieve the desired coating composition.

Once applied and cured on a conductor, a composition as described herein can offer a flexible coating that shows no visible cracks when bent on a mandrel of diameter of about 5 inches or less. In certain embodiments, the flexible coating can show no visible cracks when bent on mandrel diameters ranging from 0.5 inch to 5 inches. This flexibility is retained after heat aging as demonstrated by the ability of a sample to be bent around a mandrel having a 0.5 inch diameter after heat aging at 200° C. for 14 days The cured coating can also resist both cold and hot water as demonstrated by a weight loss of only about 0.1% to about 0.3% weight after immersion in 30° C. water for 7 days and similar weight losses after immersion in 90° C. water for 7 days. After immersion in cold and hot water, samples can be bent around a mandrel of diameter of 1 inch or less. These tests are referred to as the Mandrel Bend Tests. After curing, the composition is smooth in appearance and light gray in color.

Coatings formed from the compositions described herein can be applied around a variety of cables including high voltage overhead electricity transmission lines. As can be appreciated, such overhead electricity transmission lines can be formed in a variety of configurations and can generally include a core formed from a plurality of conductive wires. For example, aluminum conductor steel reinforced ("ACSR") cables, aluminum conductor steel supported ("ACSS") cables, aluminum conductor composite core ("ACCC") cables and all aluminum alloy conductor ("AAAC") cables. ACSR cables are high-strength stranded conductors and include outer conductive strands, and supportive center strands. The outer conductive strands can be formed from high-purity aluminum alloys having a high conductivity and low weight. The center supportive strands can be steel and can have the strength required to support the more ductile outer conductive strands. ACSR cables can have an overall high tensile strength. ACSS cables are concentric-lay-stranded cables and include a central core of steel around which is stranded one, or more, layers of aluminum, or aluminum alloy, wires. ACCC cables, in contrast, are reinforced by a central core formed from one, or more, of carbon, glass fiber, aluminum oxide fiber or polymer materials. A composite core can offer a variety of advantages over an all-aluminum or steel-reinforced conventional cable as the composite core's combination of high tensile strength and low thermal sag enables longer spans. ACCC cables can enable new lines to be built with fewer supporting structures. AAAC cables are made with aluminum or aluminum alloy wires. AAAC cables can have a better corrosion resistance, due to the fact that they are largely, or completely, aluminum. ACSR, ACSS, ACCC, and AAAC cables can be used as overhead cables for overhead distribution and transmission lines.

As can be appreciated, a suitable cable can also be a gap conductor. A gap conductor can be a cable formed of trapezoidal shaped temperature resistant aluminum zirconium wires surrounding a high strength steel core.

FIGS. 1, 2, 3, and 4 each illustrate various bare overhead conductors according to certain embodiments. Overhead conductors 100, 200, 300 and 400 can generally include only one or more conductive wires 210 and 410 like in FIGS. 2 and 4, or conductive wires 120, 210, 320 and 410 surrounding the cores 110 and 310 like in FIGS. 1 and 3. Each overhead conductor depicted in FIGS. 1-4 can include a coating (130, 220, 330 and 420) formed from the compositions described herein. Additionally, FIGS. 1 and 3 can, in certain embodiments, be formed as ACSR cables through selection of steel for the core and aluminum for the conductive wires. Likewise, FIGS. 2 and 4 can, in certain embodiments, be formed as AAAC cables through appropriate selection of aluminum or aluminum alloy for the conductive wires.

In alternate embodiments the cores 110, 310 can be steel, invar steel, composite materials, any other material that can provide strength to the conductor. In other alternate embodiments the conductive wires 120, 210, 320, 410 can be made of any suitable conductive material including copper, a copper alloy, aluminum, an aluminum alloy, including aluminum types 1350, 6000 series alloy aluminum, aluminum-zirconium alloy, carbon nanotube, graphene, or any other conductive material.

Composite core conductors are useful due to having lower sag at higher operating temperatures and their higher strength to weight ratio. Composite materials are based on glass fiber, carbon fiber, polymeric fibers, aluminum oxide fiber reinforced in aluminum or any other material that can provide strength and lower sag to the conductor. A polymeric coating can also, or alternatively, be utilized in composite core conductor designs. As can be appreciated, a composite core conductor with the coating formed from a compositional kit can have a further reduction in conductor operating temperatures due to the coating and can have both a lower sag and lower degradation of certain polymer resins in the composite from the lowered operating temperatures. Non-limiting examples of composite cores can be found in U.S. Pat. Nos. 7,015,395, 7,438,971, 7,752,754, U.S. Patent App. No. 2012/0186851, U.S. Pat. Nos. 8,371,028, 7,683,262, and U.S. Patent App. No. 2012/0261158, each of which are incorporated herein by reference.

In certain embodiments, the surface of an overhead conductor can be prepared prior to the application of a composition. The preparation process can include one or more of chemical treatment, pressurized air cleaning, hot water or steam cleaning, brush cleaning, heat treatment, sand blasting, ultrasound, deglaring, solvent wipe, plasma treatment, and the like. In certain processes, the surface of the overhead conductor can be deglared by sand blasting. As can be appreciated, the step of preparing the surface of an overhead conductor can be particularly useful for existing overhead conductors which can have buildup and deposits of soil and other non-polar organic materials. Non-polar organic materials can be removed from the surface of an overhead conductor through application of suitable alkaline cleaners including commercially available alkaline cleaners known in the art.

According to certain embodiments, a composition can be applied by spray gun or electro spray gun at about 10 psi to about 45 psi pressure using controlled air pressure. In such embodiments, the spray gun nozzle can be placed perpendicular to the direction of the conductor (e.g., an approximately 90° angle) to get a uniform coating on conductor product. In certain cases, two or more guns can also be used to get more efficient coatings. The coating thickness and density are controlled by the admixture viscosity, gun pressure, and conductor line speed.

Alternatively, in certain embodiments, a composition can be applied to an overhead conductor by one or more of dipping, a brush, or by roller. For example, in a dipping process, a cleaned and dried conductor can be dipped into a composition to allow the composition to completely coat the conductor. The conductor can then be removed from the coating composition and allowed to dry.

After application of the coating, the coating on the overhead conductor can be allowed to cure and dry under ambient conditions. When held at about 30° C. and a relative humidity of about 40% to 80%, the compositions described herein can exhibit a touch to dry time of about 2 hours or less in certain embodiments, a touch to dry time of about an hour or less in certain embodiments, and a touch to dry time of about 30 minutes or less in certain embodiments. The compositions can be completely cured in about 10 days when allowed to cure under ambient conditions. As can be appreciated, curing can optionally be accelerated by heating to elevated temperatures such as a temperature of about 70° C. to about 80° C.

As can be appreciated, a coating composition described herein can also be applied to conductors which are already installed and are currently in use. Existing conductors can be coated with a robotic system for automated or semi-automated coating. The automated system functions in three steps: (1) cleaning the conductor surface; (2) applying the coating on the conductor surface; and (3) drying the coating.

Additionally, a coating can be applied to power transmission line accessories. For example, a substation can include a variety of accessories that can benefit from the durability and optional heat emissivity of the described compositions. Examples of suitable power transmission line accessories which can be coated can include deadends/termination products, splices/joints, suspension and support products, motion control/vibration products (sometimes referred to as dampers), guying products, wildlife protection and deterrent products, conductor and compression fitting repair parts, substation products, clamps, and corona rings. A coating can be applied to such accessories in any suitable manner. For example, a coating can be applied to a new accessory after cleaning the accessory's surface. Alternatively, a coating can also be applied to an existing accessory after cleaning the accessory's surface. In each such embodiment, the coating can be dried and cured by exposure to ambient conditions.

A coating composition can be applied to a conductor in several ways. For example, a suitable coating composition can be applied by coating the individual wires before their assembly in the bare overhead conductor. As can be appreciated, it is possible to coat all of the wires of the conductor, or, more economically, coat only the outer most wires of a conductor. Alternatively, a coating composition can be applied only to the outer surface of the bare overhead conductor instead of the individual wires. In certain embodiments, the complete outer surface of a bare conductor can be coated. In other embodiments, only a portion of the bare conductor can be coated.

Figure 5:
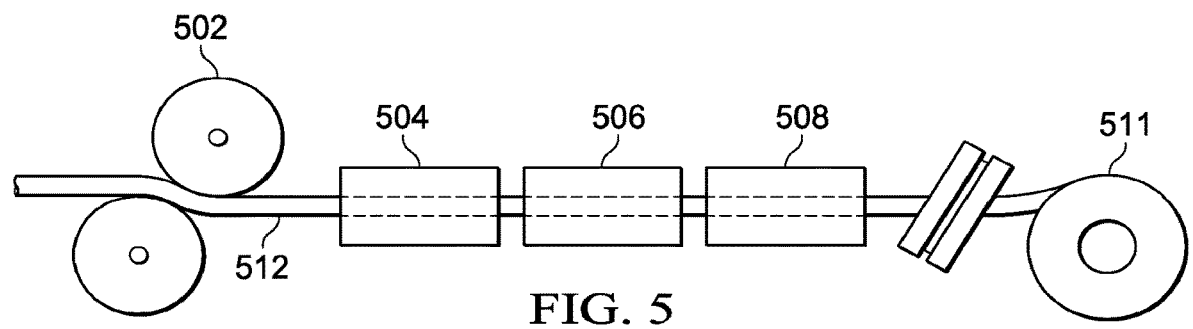
FIG. 5 depicts a continuous coating process for a conductor according to one embodiment.

As can be appreciated, a coating can be applied in a batch process, a semi-batch process, or a continuous process. FIG. 5 illustrates a continuous coating process and depicts a conductor 512 passing from an intake winding roll 502 to a pretreatment unit 504 and coating unit 506. The pretreatment unit 504 prepares the surface of the conductor for application of the coating in the coating unit 506. After the coating is applied, the conductor can be dried via a drying/curing unit 508. Once dried, the cable can be wound on a roller 511.

In the pretreatment unit 504, the surface of the conductor 512 can be prepared by media blasting. Such media can include sand, glass beads, ilmenite, steel shot, and other suitable media. The media blasting can be followed by air-wiping to blow the particulate materials off the conductor 512. An air-wipe uses jets to blow air on to the conductor 512 at an angle and in a direction opposing the direction of travel of the conductor 112. The air jets create a 360° ring of air that attaches to the circumference of the conductor 512 and wipes the surface with the high velocity of air. In such an example, as the conductor exits the pretreatment unit 504, any particles adhered to the conductor 512 can be wiped and blown back into the pretreatment unit 504. A suitable air jet can operate at about 60 to about 100 PSI, in certain embodiments, at about 70 PSI to about 90 PSI in certain embodiments, and at about 80 PSI in certain embodiments. The air jet can have a velocity (coming out of the nozzles) of about 125 mph to about 500 mph in certain embodiments, about 150 mph to about 400 mph in certain embodiments, and about 250 mph to about 350 mph in certain embodiments. After the air-wipe, the number of particles that are greater than about 10 microns in size remaining on the surface of the conductor can be about 1,000 particles per square feet, or less, in certain embodiments, or about 100 particles per square feet, or less, in certain embodiments. After the air wipe, the conductor can be cured. As can be appreciated, the compositions described herein can be cured under ambient conditions and do not require the conductor to be heated prior to application or for curing to occur.

Figure 6:
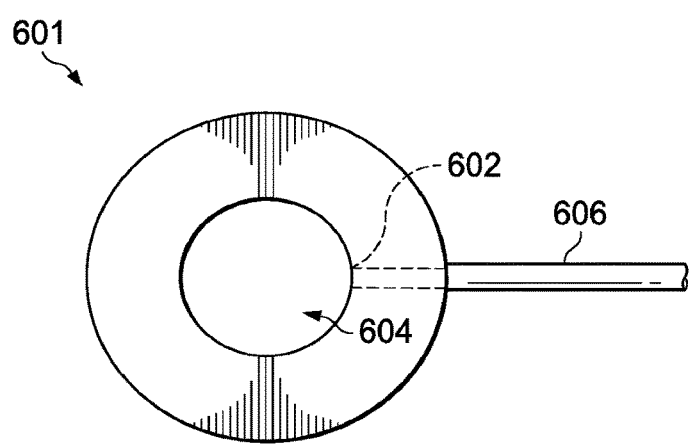
FIG. 6 depicts a cross-sectional view of a flooded die according to one embodiment.
Figure 7:
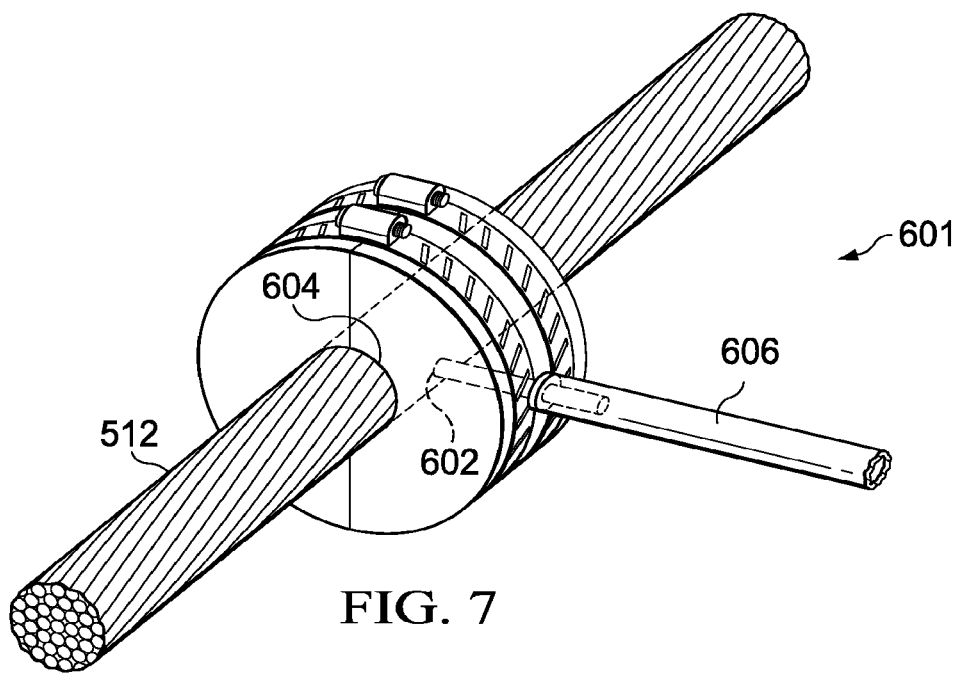
FIG. 7 depicts a perspective view of the flooded die of FIG. 6.
Figure 8:
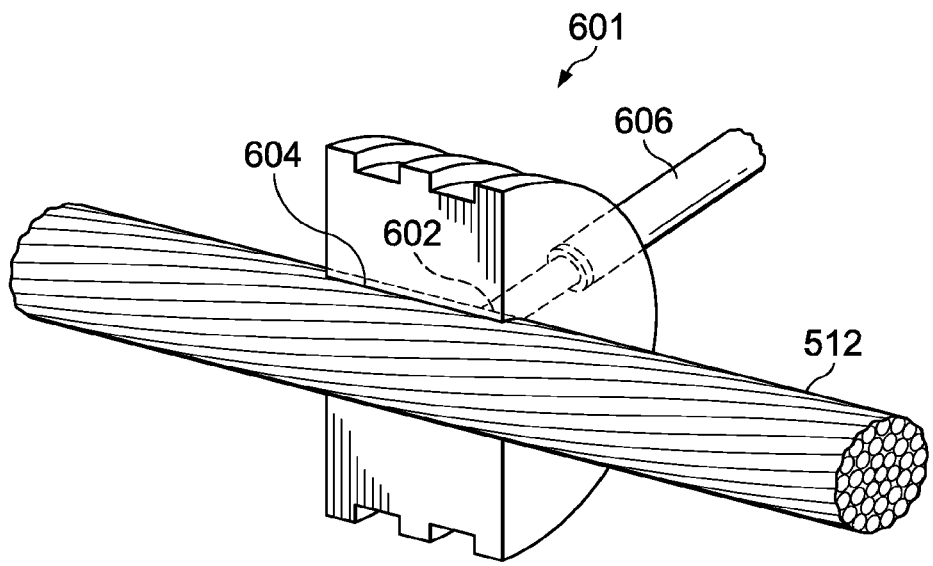
FIG. 8 depicts a cut-away view of the flooded die of FIG. 6.

Once the surface of the conductor 512 is prepared, it can be ready for coating. The coating process can take place in the coating unit where the cable passes through a flooded die that deposits a liquid suspension of the coating composition onto the prepared surface. FIGS. 6 to 8 depict an annular shaped flooded die 601. The coating suspension can be fed to the die 601 via a tube 606. As the conductor 512 passes though the center opening 604 of the flooded die 601, the coating compositions coats the conductor 512 via one or more opening ports 602 in the inner surface of the die 601. In certain embodiments, the flooded die 601 can include two or more, four or more, or six or more, opening ports 602 evenly spaced around the circumference of the inner surface. Once the conductor 512 exits the flooded die, the conductor 512 can pass through another air wipe to remove excess coating composition and to spread the coating composition evenly around the conductor. In the case of a stranded conductor, the air wipe can allow the coating to penetrate the grooves between the strands on the surface of the conductor. This air wipe can operate using similar conditions as the air wipe in the pretreatment unit 504.

A coating composition can alternatively be applied by a spray gun (e.g., electro spray gun) in certain embodiments. A spray gun can apply the coating composition using a pressure of about 10 psi to about 45 psi. In such embodiments, the spray gun nozzle can be placed perpendicular (e.g., at about 90°) to the longitudinal direction of the substrate to achieve a uniform coating on the substrate. In certain embodiments, two or more spray guns can be used to obtain more efficient, or uniform, coatings. The coating thickness and density can be controlled by the admixture viscosity, gun pressure, and conductor line speed.

Once the conductor 512 is coated, it can pass through the drying/curing unit 508, as depicted in FIG. 5. The crying/curing unit 508 can prevent foreign debris from impacting the quality of the coating while the composition cures under ambient conditions. As can be appreciated, forced air can optionally be used to increase the rate of curing. Once dried or cured, the coated conductor can be wound on a roller 511 for storage.

The continuous process, if operated for an individual strand (instead of a stranded cable), can operate at a line speed of about 2500 ft/min or less in certain embodiments, from about 9 ft/min to about 2000 ft/min in certain embodiments, from about 10 ft/min to about 500 ft/min in certain embodiments, and from about 30 ft/min to about 300 ft/min in certain embodiments.

Once coated onto a conductor 512 and dried/cured, the coating layer can have a thickness of less than about 100 microns in certain embodiments, and in certain embodiments about 10 to about 30 microns. The coatings produced can be non-white having a L value of about 20 or more. The coatings can be electrically non-conductive, semi-conductive, or conductive.

The coated conductor can exhibit improved heat dissipation. Emissivity is the relative power of a surface to emit heat by radiation, and the ratio of the radiant energy emitted by a surface to the radiant energy emitted by a blackbody at the same temperature. Emittance is the energy radiated by the surface of a body per unit area. Emissivity can be measured, for example, by the method disclosed in U.S. Patent App. Pub. No. 2010/0076719 which is incorporated herein by reference or in accordance to ASTM E408 (2013). The coated conductor can have an emissivity coefficient of about 0.3 or more in certain embodiments, in certain embodiments, about 0.5 or more, and in certain embodiments about 0.75 or more. Solar absorptivity can be measured in accordance to ASTM E903 (2012). In certain embodiments, a coated conductor can have a solar absorptivity of about 0.3 or more, and in certain embodiments, a solar absorptivity of about 0.5 or more.

As can be appreciated, the compositions described herein can also be applied to other metal substrates such as parts used in the automotive or aerospace industries. Generally, any aluminum substrate can be coated.

Examples

Table 1 depicts the components, on a dry weight basis, of two Example compositions including a metal silicate binder. The metal silicate binders and the remaining components were initially premixed separately to form two parts of a compositional kit. The water immersion tests refer to a 1" Mandrel Bend Test as described herein. Inventive Example 2 can be cured at ambient temperature while Comparative Example 1 is cured at elevated temperatures.

TABLE 1

| Component Type | Component | Comp. Ex. 1 | Inv. Ex. 2 |
| --- | --- | --- | --- |
| Filler | Calcined clay | 11.1 | 20.0 |
| | Talc (Magnesium silicate) | 11.1 | 20.0 |
| Emissivity Agent | Silicon carbide | 4.4 | 4.4 |
| | Titanium dioxide | 13.3 | 13.3 |
| Comparative Crosslinking Agent | Magnesium hydroxide | 11.1 | 0.0 |
| Crosslinking Facilitator | Condensed aluminum phosphate (Latent acid) | 0.0 | 6.7 |
| | Zinc powder (Amphoteric metal powder) | 13.3 | 0.0 |
| Additives | Additives | 2.2 | 2.2 |
| Metal Silicate Binder | Potassium silicate (38%) | 31.0 | 31.0 |
| | Sodium silicate | 2.2 | 2.2 |
| Property Flexibility | Water Immersion Test at 30° C. | Passes 5 days | Passes 7 days |

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A method of coating an overhead conductor, comprising:
    providing a coating composition formed from a first part and a second part, wherein the first part comprises a filler, an emissivity agent, and a crosslinking facilitator comprising a latent acid compound, wherein the latent acid compound comprises condensed aluminum phosphate; and wherein the second part comprises a metal silicate binder;
    applying the coating composition onto an outer surface of the overhead conductor; and
    curing the coating composition at a temperature of from about 15° C. to about 40° C. to form a coated overhead conductor having a cured coating on the outer surface thereof; and
    wherein the composition comprises:
    about 35% to about 45%, by dry weight, of the filler;
    about 15% to about 22%, by dry weight, of the emissivity agent;
    about 4% to about 10%, by dry weight, of the crosslinking facilitator; and
    about 25% to about 40%, by dry weight, of the metal silicate binder.

2. The method of claim 1, wherein the first part and the second part are mixed together to form the coating composition.

3. The method of claim 1, wherein applying the coating composition onto an outer surface of the overhead conductor comprises passing the overhead conductor through a flooded die that deposits a liquid suspension of the composition onto the outer surface of the overhead conductor.

4. The method of claim 1, wherein curing the coating composition comprises allowing the composition to cure and dry under ambient conditions.

5. The method of claim 1, wherein the touch to dry time is about 2 hours or less after curing the coating composition is initiated.

6. The method of claim 1, wherein curing the coating composition is complete after about 10 days.

7. The method of claim 1, wherein the latent acid compound is configured to release an acid component when subject to an environment having a pH of about 9 or more.

8. The method of claim 1, wherein crosslinking of the coating composition crosslinks occurs at a pH of about 11 or less.

9. The method of claim 1, wherein the filler comprises one or more of talc, calcined kaolin, aluminum oxide, aluminosilicate, and quartz.

10. The method of claim 1, wherein the emissivity agent comprises one or more of silicon carbide, boron carbide, and titanium dioxide.

11. The method of claim 1, wherein the metal silicate binder comprises one or more of potassium silicate, sodium silicate, lithium silicate, and colloidal silica.

12. The method of claim 1, wherein the composition comprises the crosslinking facilitator at about 10% to about 30% by weight of the metal silicate binder.

13. The method of claim 1, wherein the composition further comprises a liquid carrier, and wherein the total solids content of the composition is about 35% to about 55%.

14. The method of claim 13, wherein the liquid carrier comprises water.

15. The method of claim 1, wherein the coated overhead conductor has an operating temperature that is about 10° C. lower than the operating temperature of an uncoated overhead conductor.

16. The method of claim 1, wherein the coated overhead conductor passes a 0.5 inch mandrel bend test, such that the coating shows no visible cracks when bent on a mandrel having a diameter of 0.5 inches.

17. The method of claim 1, wherein the coated overhead conductor passes a 1 inch mandrel bend test after immersion in water at 30° C. for 7 days, such that the coating shows no visible cracks when bent on a mandrel having a diameter of 1 inch.

18. A method of coating an overhead conductor, comprising:
providing a coating composition comprising:
about 35% to about 45%, by dry weight, of a filler;
about 15% to about 22%, by dry weight, of an emissivity agent;
about 4% to about 10%, by dry weight, of a crosslinking facilitator comprising a latent acid compound; wherein the latent acid compound comprises condensed aluminum phosphate and
about 25% to about 40%, by dry weight, of a metal silicate binder;
wherein the composition comprises the crosslinking facilitator at about 10% to about 30% by weight of the metal silicate binder;
applying the coating composition onto an outer surface of the overhead conductor; and
curing the coating composition at a temperature of from about 15° C. to about 40° C. to form a coated overhead conductor having a cured coating on the outer surface thereof, wherein curing the coating composition comprises allowing the composition to cure and dry under ambient conditions;
wherein the coated overhead conductor passes a 1 inch mandrel bend test after immersion in water at 30° C. for 7 days, such that the coating shows no visible cracks when bent on a mandrel having a diameter of 1 inch.

\* \* \* \* \*